United States Patent [19]

Evers

[11] 3,994,861
[45] Nov. 30, 1976

[54] LONG CHAIN-PERFLUOROALKYLENE ETHER BIBENZOXAZOLE POLYMERS

[75] Inventor: Robert C. Evers, Dayton, Ohio

[73] Assignee: The United States of America as represented by the Secretary of the Air Force, Washington, D.C.

[22] Filed: Sept. 4, 1975

[21] Appl. No.: 610,474

[52] U.S. Cl. .................................................. 260/61
[51] Int. Cl.² .......................................... C08G 65/40
[58] Field of Search ............................ 260/47 R, 61

[56] References Cited
OTHER PUBLICATIONS

Journal of Applied Polymer Science—vol. 19, pp. 2731–2741 (1975).

Primary Examiner—V. P. Hoke
Attorney, Agent, or Firm—Joseph E. Rusz; Cedric H. Kuhn

[57] ABSTRACT

Long chain-perfluoroalkylene ether bibenzoxazole polymers are synthesized by the polycondensation of long chain-perfluoroalkylene ether bis(o-aminophenol) compounds and perfluoroalkylene ether diimidate esters. The elastomeric polymers have a combination of high thermooxidative stability and superior low temperature visco-elastic properties that render them particularly useful for wide temperature range applications, such as seals, sealants and the like.

6 Claims, No Drawings

LONG CHAIN-PERFLUOROALKYLENE ETHER BIBENZOXAZOLE POLYMERS

RIGHTS OF THE GOVERNMENT

The invention described herein may be manufactured and used by or for the Government of the United States for all governmental purposes without the payment of any royalty.

FIELD OF THE INVENTION

This invention relates to long chain-perfluoroalkylene ether bibenzoxazole polymers. In one aspect it relates to a method for synthesizing the polymers.

BACKGROUND OF THE INVENTION

A need exists for thermally stable, elastomeric polymers for various aerospace seal and sealant applications. For a polymer to satisfy the requirements, it must also retain its elastomeric properties at sub-zero temperatures. Furthermore, the polymers should possess other desirable properties such as hydrolytic stability and fuel resistance. Polymers that go a long way toward fulfilling the need are disclosed in U.S. Pat. No. 3,846,376, issued to me on Nov. 5, 1974. However, it would be very desirable to provide thermally stable polymers that retain their viscoelastic properties at temperatures even lower than those of the polymers of the cited patent.

It is an object of this invention, therefore, to provide polymeric materials for solving problems in high temperature elastomer applications which require high thermooxidative stability and superior low temperature viscoelastic properties.

Another object of the invention is to provide a method for synthesizing the polymers.

Other objects and advantages of the invention will become apparent to those skilled in the art upon consideration of the accompanying disclosure.

SUMMARY OF THE INVENTION

The present invention resides in a thermally stable polymer composition having the following formula:

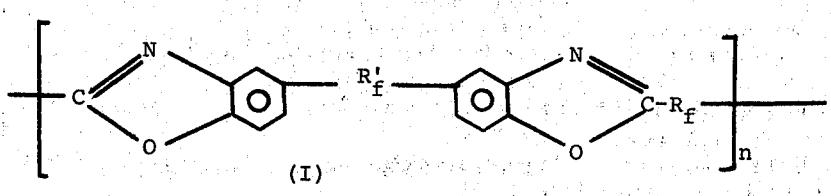

wherein $R_f'$ is $(CF_2)_2O(CF_2)_5O(CF_2)_2$;

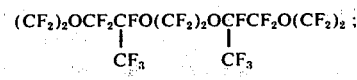

or $(CF_2)_2O(CF_2)_2O(CF_2)_2O(CF_2)_5O(CF_2)_2$; $R_f$ is $(CF_2)_4O(CF_2)_4O(CF_2)_4$; $CF_2O(CF_2CF_2O)_a(CF_2)_5O(CF_2CF_2O)_bCF_2$, where $(a+b)$ equals 4 or 7; or

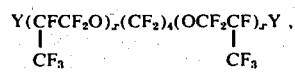

where Y is

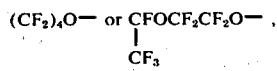

$x$ is an integer from 1 to 5, inclusive; and $n$ is an integer equal to at least 2, preferably an integer in the range of about 4 to 100. Alternatively, $n$ can be defined as an integer having a value such that the polymer has an inherent viscosity of at least 0.10, e.g., from 0.10 to 1.0 when measured at 25° C as a 0.2 weight percent solution in hexafluoroisopropanol.

In another embodiment, the instant invention resides in a method for preparing long chain-perfluoroalkylene ether bibenzoxazole polymers by reacting in an inert atmosphere certain long chain-perfluoroalkylene ether bis(o-aminophenol) compounds with certain perfluoroalkylene ether diimidate esters. The reaction is carried out in a solvent in the presence of glacial acetic acid. Examples of gases that can be employed to provide an inert atmosphere include nitrogen, argon and helium.

The monomers used and the condensation reaction involved in preparing the polymers of this invention are shown by the following equation:

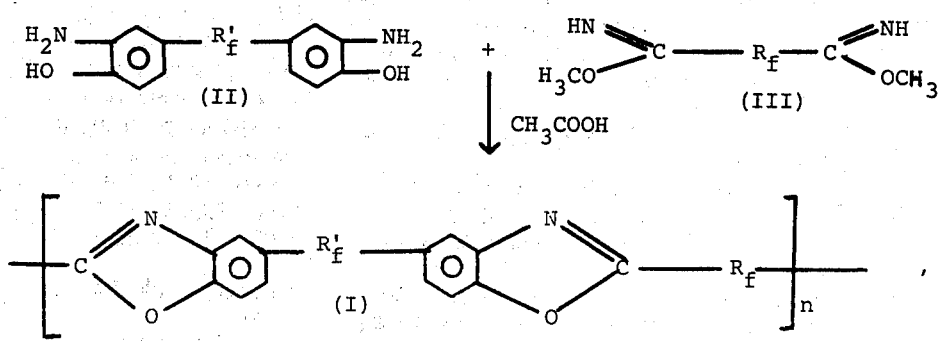

In the foregoing equation, $R_f'$, $R_f$ and n are as defined hereinabove. As seen from the equation, the source of the $R_f'$ and $R_f$ groups of the polymer are the perfluoroalkylene ether bis(o-aminophenol) compounds and the perfluoroalkylene ether diimidate esters, respectively. In carrying out the reaction, equimolar molar amounts of the bis(o-aminophenol) compounds and the diimidate esters are utilized. The mole ratio of glacial acetic acid to the diimidate ester is at least 2:1, e.g., 2 to 4:1. Usually, it is preferred to employ four molar equivalents of acetic acid for each mole of the diimidate ester. The acetic acid reacts with ammonia formed during the condensation reaction, converting it to ammonium acetate and thereby driving the reaction to completion.

The condensation reaction is conducted in the presence of a halogenated hydrocarbon which is a solvent for the monomers. In order to obtain high molecular polymers, it has been found to be necessary to use hexafluoroisopropanol as the solvent. For example, when using 1,1,2-trichlorotrifluoroethane as the solvent, the polymers obtained are lower in molecular weight than those produced when using hexafluoroisopropanol. The temperature at which the condensation reaction is conducted generally ranges from about 45° to 58° C. The reaction period depends upon the molecular weight that it is desired the polymer product to have, being longer for higher molecular weight products. Usually, the reaction time ranges from about 7 to 20 days although shorter and longer periods can be employed.

At the end of the reaction period, the polymer is recovered and purified by a general procedure that is conventionally followed in solution polymerization process. Thus, the reaction mixture is poured into a non-solvent for the polymer, e.g., into an alcohol such as methanol, thereby causing the polymer to precipitate from solution. The precipitated polymer is then separated from the liquid by any suitable means, such as by filtration or decantation. After washing the separated polymer with an alcohol, it is then redissolved in a solvent, such as 1,1,2-trichlorotrifluoroethane, and again precipitated from solution by pouring the solution into methanol. After separation of the precipitated polymer, it is again washed with methanol and then dried under a vacuum. It is to be understood that the foregoing procedure can be repeated one or more times in order to further purify the product.

The following bis(o-aminophenol) compounds (formula II) are used in synthesizing the polymers of this invention:

1. 1,11-bis(3-amino-4-hydroxyphenyl)perfluoro-3,9-dioxaundecane,
2. 1,14-bis(3-amino-4-hydroxyphenyl)perfluoro-5,10-dimethyl-3,6,9,12-tetraoxatetradecane, and
3. 1,17-bis(3-amino-4-hydroxyphenyl)perfluoro-3,6,9,15-tetraoxaheptadecane.

The above-listed compounds can also be represented by formula II above. In this formula $R_f'$ is one of the following groups:

$(CF_2)_2O(CF_2)_5O(CF_2)_2$,

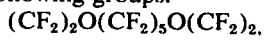

or $(CF_2)_2O(CF_2)_2O(CF_2)_2O(CF_2)_5O(CF_2)_2$.

The preparation of 1,11-bis(3-amino-4-hydroxyphenyl)perfluoro-3,9-dioxaundecane is described in U.S. Pat. No. 3,846,376, issued to me on Nov. 5, 1974. The synthesis of the other two bis(oaminophenol) compounds listed above is disclosed in my copending patent application Ser. No. 610,470, filed on Sept. 4, 1975. The disclosures of the aforementioned patent and patent application are incorporated herein by reference.

The diimidate esters used in preparing the polymers of this invention correspond to formula III in which $R_f$ is one of the following groups:

1. $(CF_2)_4O(CF_2)_4O(CF_2)_4$;
2.

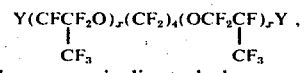

where Y and x are as indicated above; and

3. $CF_2O(CF_2CF_2O)_a(CF_2)_5O(CF_2CF_2O)_bCF_2$, where $(a+b)$ equals 4 or 7. Diimidate esters containing groups (1) and (2) as listed above are prepared as disclosed in commonly assigned application Ser. No. 610,520, filed on Sept. 4, 1975 by Christ Tamborski. The disclosure of this application is incorporated herein be reference. The preparation of the diimidate esters containing group (3) as listed above is described below in Examples I and II.

A more comprehensive understanding of the invention can be obtained by referring to the following illustrative examples which are not intended, however, to be unduly limitative of the invention.

EXAMPLE I

Synthesis of
$CH_3OC(=NH)CF_2(OCF_2CF_2)_aO(CF_2)_5O(CF_2O)_bCF_2C(=NH)OCH_3$ a+b=4

A mixture of the diacid fluoride,

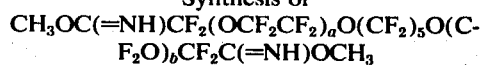

(obtained from PCR, Inc., Gainesville, Florida) (42.70 g, 0.045 m), anhydrous ethanol (100 ml), and 0.5 ml of concentrated sulfuric acid was refluxed with stirring for 22 hours. During this time, the cloudy reaction mixture became a clear solution. Upon cooling the diester product separated as a heavy lower layer. On the addition of water, additional product separated. The heavy layer was separated from the aqueous layer, dried over anhydrous magnesium sulfate, and distilled to give 39.28 g (88% yield) of diester product, b.p. 140° C/0.45 mm Hg.

Analysis — Calc'd: C,25.42; H,1.02. Found: C,25.40; H,1.08.

Molecular weight (mass spectroscopy) Calc'd: 992. Found: 992

The diester,

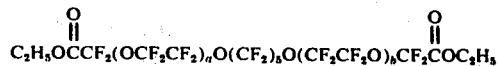

(a+b=4) (38.40 g, 0.039 m) was dissolved in 200 ml of 1,1,2-trichlorotrifluoroethane and excess ammonia gas was slowly bubbled through the solution. The solvent was then evaporated from the reaction mixture to yield 35.65 g (98% yield) of the diamide product, m.p. 101°–105° C.

Molecular weight (mass spectroscopy) Calc'd: 934. Found: 934.

The diamide,

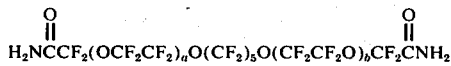

(a+b=4)
(35.50 g, 0.038 m) was thoroughly mixed with an excess of phosphorus pentoxide and placed in a distilling flask. The flask was slowly heated under a reduced pressure of 105 mm Hg. The fraction of dinitrile product (28.35 g, 83% yield) boiling at 166° C/.05 mm was collected.

Analysis — Calc'd: C,22.73; H,0.00; H,3.12. Found: C,22.52; H,0.00; N,3.32.

Molecular weight (mass spectroscopy) Calc'd: 898. Found: 898.

To a solution of 0.1 g of sodium in 50 ml of anhydrous methanol was added the dinitrile NCCF$_2$(OCF$_2$CF$_2$)$_a$O(CF$_2$)$_5$O(CF$_2$CF$_2$O)$_b$CF$_2$CN (m+n=4) (21.10 g, 0.024 m). The reaction mixture was stirred at room temperature for 24 hours. On adding water to the methanolic solution, a heavy lower organic layer formed. It was separated from the aqueous layer, dried over magnesium sulfate, and distilled to yield 17.10 g (74% yield) of diimidate ester, b.p. 111° C/0.30 mm Hg. The infrared spectral data and the $^1$H and $^{19}$F nuclear magnetic resonance spectra were consistent with the diimidate ester structure.

Analysis — Calc'd: C,23.72; H,0.84; N,2.91 Found C,23.73; H,N,2.84

Molecular weight (mass spectroscopy) Calc'd: 962. Found: 962.

EXAMPLE II

Synthesis of
CH$_3$OC(=NH)CF$_2$(OCF$_2$CF$_2$)$_a$O(CF$_2$)$_5$O(CF$_2$C-F$_2$O)$_b$CF$_2$C(=NH)OCH$_3$ a+b=7

To a solution of 0.1 g sodium dissolved in 30 ml of anhydrous methanol was added the dinitrile, NCCF$_2$(OCF$_2$CF$_2$)$_a$O(CF$_2$)$_5$O(CF$_2$CF$_2$O)$_b$—CF$_2$CN (a+b=7) (obtained from PCR, Inc., Gainesville, Florida) (12.50 g, 0.010 m). The reaction was stirred at room temperature for approximately 18 hours. On adding water to the cloudy methanolic solution, a heavy lower organic layer formed. It was separated from the aqueous phase, dried over anhydrous magnesium sulfate, and distilled to give 11.70 g (89% yield) of the diimidate ester, b.p. 114° C/0.08 mm Hg. The infrared spectral data, the $^1$H and $^{19}$F nuclear magnetic resonance spectra, and the mass spectral data were consistent with the diimidate ester structure.

Analysis — Calc'd: C,22.95; H,0.62; N,2.14. Found: C,22.33; H,0.44; H,2.24.

The preparation of the diacid fluoride used in Example I and the dinitrile used in Example II is described by R. E. Cochoy in commonly assigned application Ser. No. 553,701, filed on Feb. 27, 1975. The disclosure of this application is incorporated herein by reference.

EXAMPLE III

A long chain-perfluoroalkylene ether bibenzoxazole polymer was prepared in a condensation reaction represented by the following equation and as described below.

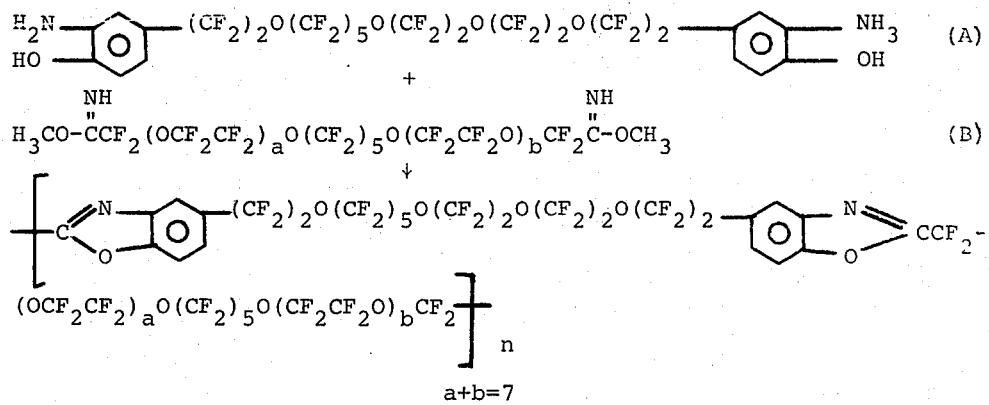

a+b=7

Redistilled hexafluoroisopropanol (HFIP) (3 ml) was added to a mixture of A (0.880 g, 0.00094 mole) and B (1.239 g, 0.00094 mole). To the resulting clear amber solution was added glacial accetic acid (0.250 g, 0.004 mole). The polycondensation reaction was allowed to proceed under nitrogen at 50°–55° C for seven days at which time the viscous amber solution was poured into 200 ml of cold methanol (−78° C). The polymer was isolated by filtration, washed several times with cold methanol, redissolved in 15 ml of 1,1,2-trichlorotrifluoroethane, and then reprecipitated by pouring the solution into cold methanol. Thorough washing of the product with cold methanol followed by drying at 100° C (0.05 mm Hg) yielded 1.01 g (60% yield) of soft rubbery polymer ($\eta$ inh = 0.30 in hexafluorosiopropanol at 25° C).

Analysis — Calc'd: C,26.91; H,0.28; H,1.31. Found: C,26.80; H,0.17; N,1.42.

Thermal Properties

Thermogravimetric analysis indicated that onset of breakdown in air occurred at 400° C with a 20% weight loss at 500° C. Differential scanning calorimetry revealed a glass transition temperature of −58° C.

EXAMPLE IV

A long chain-perfluoroalkylene ether bibenzoxazole polymer was prepared in a condensation reaction represented by the following equation and as described below.

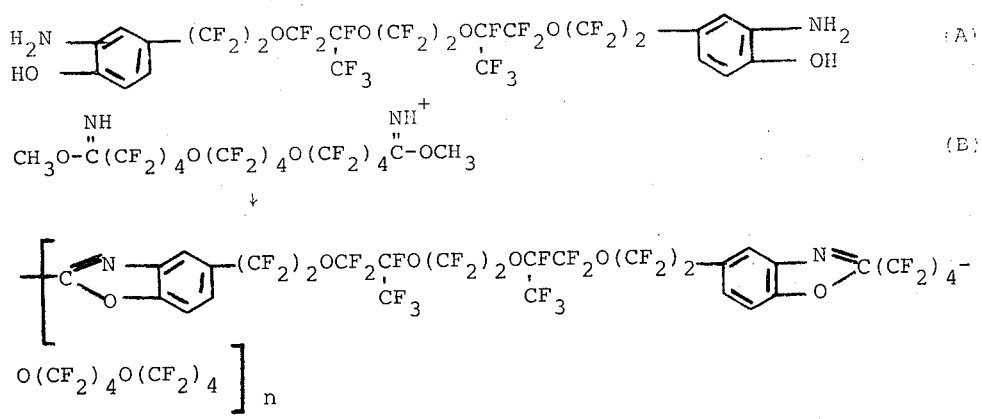

To a mixture of A (0.441 g, 0.0005 mole) and B (0.375 g, 0.0005 mole) was added 3 ml of redistilled hexafluoroisopropanol (HFIP). Glacial acetic acid (0.12 g, 0.002 mole) was added with stirring to the resultant clear amber solution. The polycondensation reaction was allowed to proceed under nitrogen for 18 days at 50°–55° C at which time the viscous reaction mixture was poured into 100 ml of cold methanol (−78° C). The polymer was isolated by filtration, washed several times with cold methanol, redissolved in 1,1,2-trichlorotrifluoroethane, and then re-precipitated as above in cold methanol. Thorough washing of the product with cold methanol followed by drying at 180° C (0.05 mm Hg) yielded 0.50 g (65% yield) of tough rubbery polymer ($\eta$ inh = 0.41 in hexafluoroisopropanol at 25° C).

Analysis — Calc'd: C,29.82; H,0.39; N,1.83. Found: C,30.17; H,0.35; N,1.66.

Thermal Properties

Thermogravimetric analysis indicated that onset of breakdown in air occurred at 425° C with a 15% weight loss at 500° C. Differential scanning calorimetry revealed a glass transition temperature of −24° C.

EXAMPLE V

A series of runs identified in the table below as runs no. 1–7 was carried out in which long chain-perfluoroalkylene ether bibenzoxazole polymers were prepared in accordance with the procedure described in Examples III and IV. The condensation reactions involved can be represented by the following equation:

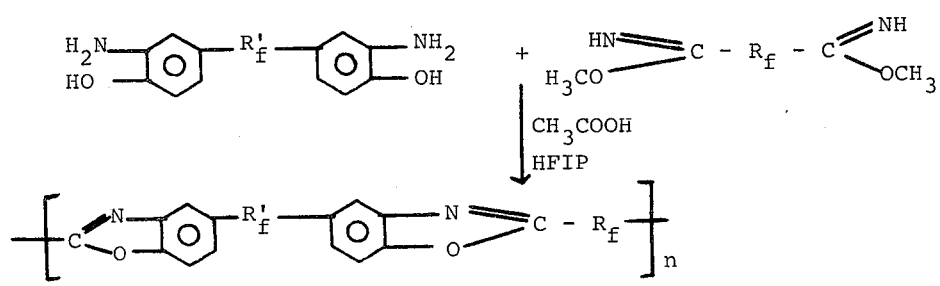

The $R_f$ and $R_f'$ groups contained in the starting materials and polymer products were as defined in Table I. The reaction periods used and the results obtained are shown in Table II.

TABLE I

| Run No. | $R_f'$ | $R_f$ |
|---|---|---|
| 1 | $(CF_2)_2O(CF_2)_5O(CF_2)_2$ | $(CF_2)_4O(CF_2)_4O(CF_2)_4$ |
| 2 | '' | $CF_2O(CF_2CF_2O)_a(CF_2)_5O(CF_2CF_2O)_bCF_2$ (a + b = 4) |
| 3 | '' | $CF_2O(CF_2CF_2O)_a(CF_2)_5O(CF_2CF_2O)_bCF_2$ (a + b = 7) |
| 4 | '' | $(CF_2)_4O(CFCF_2O)_3(CF_2)_4(OCF_2CF)_3O(CF_2)_4$ with $CF_3$ branches |
| 5 | '' | $(CF_2)_4O(CFCF_2O)_2(CF_2)_4(OCF_2CF)_2O(CF_2)_4$ with $CF_3$ branches |
| 6 | $(CF_2)_2OCF_2CFO(CF_2)_2OCFCF_2O(CF_2)_2$ with $CF_3$ branches | $(CF_2)_4O(CF_2)_4O(CF_2)_4$ |
| 7 | $(CF_2)_2O(CF_2)_2O(CF_2)_2O(CF_2)_5O(CF_2)_2$ | $CF_2O(CF_2CF_2O)_m(CF_2)_5O(CF_2CF_2O)_nCF_2$ (m + n = 7) |

TABLE II

| Run No. | Time-Hrs | $\eta inh^{(1)}$ dl/g | $T_g$-°C$^{(2)}$ | Analysis C | H | Calc'd / Found N |
|---|---|---|---|---|---|---|
| 1 | 312 | 0.40 | −20 | 31.18 (31.59) | 0.44 (0.68) | 2.08 (2.04) |
| 2 | 288 | 0.28 | −41 | 29.21 (29.78) | 0.38 (0.74) | 1.79 (1.75) |
| 3 | 312 | 0.30 | −55 | 27.66 (27.58) | 0.31 (0.29) | 1.47 (1.22) |
| 4 | 288 | 0.17 | −41 | 27.15 (27.32) | 0.26 (0.31) | 1.19 (1.24) |
| 5 | 240 | 0.11 | −40 | 28.05 (28.75) | 0.30 (0.69) | 1.39 (1.33) |
| 6 | 432 | 0.41 | −24 | 29.82 (30.17) | 0.39 (0.35) | 1.83 (1.66) |
| 7 | 168 | 0.30 | −58 | 26.91 (26.80) | 0.28 (0.17) | 1.31 (1.42) |

$^{(1)}$0.2 g/dl, 25° C, HFIP
$^{(2)}$Determined by differential scanning calorimetry, $\Delta T = 20°$ C/min.

From the data in the foregoing examples, it is seen that the products of this invention are thermally stable elastomeric polymers. Furthermore, the rubbery polymers have a very low glass transition temperature, e.g., as low as −58° C (−72° F). The broad use temperature range of the polymers, which surpasses that of known polymers, renders them particularly useful for many aerospace applications, especially as seals and sealants.

Various modifications of the invention can be made by those skilled in the art in the light of the foregoing disclosure without departing from the spirit and scope of the invention.

I claim:

1. A thermally stable polymer consisting essentially of recurring units having the following formula:

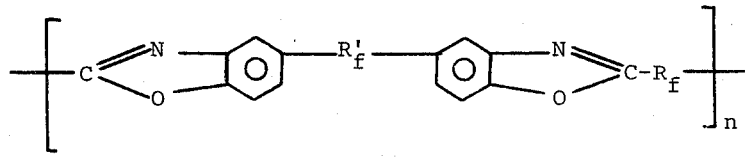

wherein $R_f'$ is $(CF_2)_2O(CF_2)_5O(CF_2)_2$;

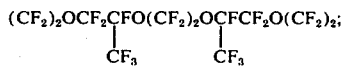

or $(CF_2)_2O(CF_2)_2O(CF_2)_2O(CF_2)_5O(CF_2)_2$; $R_f$ is $(CF_2)_4O(CF_2)_4O(CF_2)_4$; $CF_2O(CF_2CF_2O)_a(CF_2)_5O(CF_2CF_2O)_bCF_2$, where a+b equals 4 or 7; or $$Y(CFCF_2O)_x(CF_2)_4(OCF_2CF)_xY,$$
with $CF_3$ groups on the indicated carbons where Y is $(CF_2)_4O-$ or $$CFOCF_2CF_2O-,$$
with $CF_3$ x is an integer from 1 to 5, inclusive, and n is an integer having a value such that the polymer has an inherent viscosity from about 0.10 to 1.0 when measured at 25° C as a 0.2 weight percent solution in hexafluoroisopropanol.

2. The thermally stable polymer of claim 1 in which $R_f'$ is $(CF_2)_2O(CF_2)_5O(CF_2)_2$ and $R_f$ is $(CF_2)_4O(CF_2)_4O(CF_2)_4$.

3. The thermally stable polymer of claim 1 in which $R_f'$ is $(CF_2)_2O(CF_2)_5O(CF_2)_2$ and $R_f$ is $CF_2O(CF_2CF_2O)_a(CF_2)_5O(CF_2CF_2O)_bCF_2$, where a+b equals 4.

4. The thermally stable polymer of claim 1 in which $R_f'$ is $(CF_2)_2O(CF_2)_5O(CF_2)_2$ and $R_f$ is $CF_2O(CF_2CF_2O)_a(CF_2)_5O(CF_2CF_2O)_bCF_2$, where a+b equals 7.

5. The thermally stable polymer of claim 1 in which $R_f'$ is $$(CF_2)_2OCF_2CFO(CF_2)_2OCFCF_2O(CF_2)_2$$
with $CF_3$ groups and $R_f$ is $(CF_2)_4O(CF_2)_4O(CF_2)_4$.

6. The thermally stable polymer of claim 1 in which $R_f'$ is $(CF_2)_2O(CF_2)_2O(CF_2)_2O(CF_2)_5O(CF_2)_2$ and $R_f$ is $CF_2O(CF_2CF_2O)_a(CF_2)_5O-$ $(CF_2CF_2O)_bCF_2$, where a+b equals 7.

* * * * *